United States Patent [19]

Zacchio

[11] Patent Number: 4,670,754
[45] Date of Patent: Jun. 2, 1987

[54] MICROWAVE TANK-CONTENTS LEVEL MEASURING ASSEMBLY WITH A PHASE CONTROLLED LENS

[75] Inventor: Joseph M. Zacchio, Wethersfield, Conn.

[73] Assignee: Transamerica Delaval, Inc., Princeton, N.J.

[21] Appl. No.: 814,570

[22] Filed: Dec. 30, 1985

[51] Int. Cl.⁴ .................... G01F 23/00; G01S 13/08
[52] U.S. Cl. .................................. 342/124; 73/290 R
[58] Field of Search ...................... 73/290 R; 342/124

[56] References Cited

U.S. PATENT DOCUMENTS 4,566,321  1/1986  Zacchio .................... 342/124 X

Primary Examiner—T. M. Tubbesing
Attorney, Agent, or Firm—Hopgood, Calimafde, Kalil, Blaustein & Judlowe

[57] ABSTRACT

High amplitude signals reflected back to the horn radiator-receptor in a microwave tank-contents measuring assembly from the interface between a microwave dielectric lens and the tank-contents-atmosphere, which reflected signals mimic returning ranging signals and interfere with detection of returning legitimate ranging signals, are substantially canceled by incorporating in the lens which is plano-convex a thin layer of electrically conductive material in a plane parallel to the plano surface of the lens, said layer being formed from a uniform array of a repetitive pattern of regions containing the conductive material alternating with regions free of said material. One embodiment has an hexagonal array of circular conductive regions while another embodiment has the conductive material in the form of a rectilinear grid.

11 Claims, 9 Drawing Figures

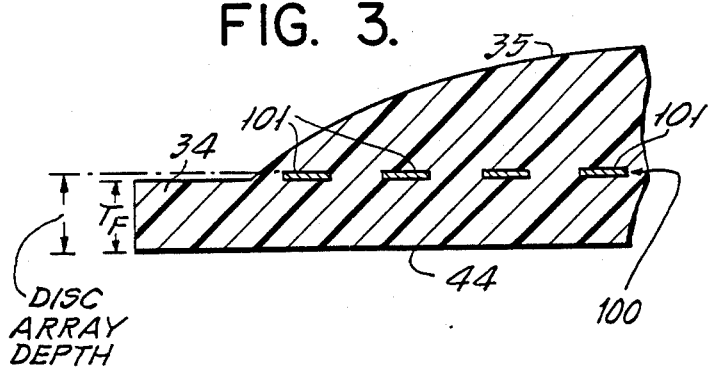
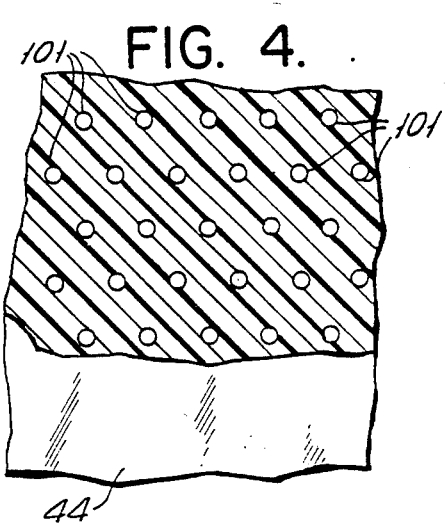
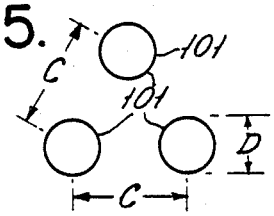
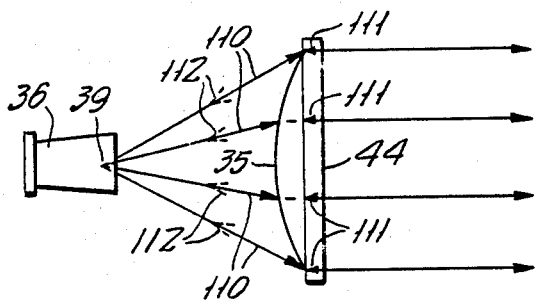
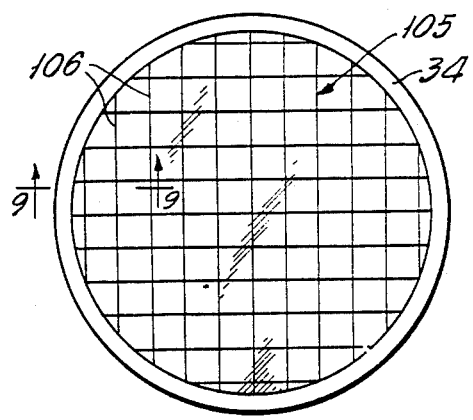
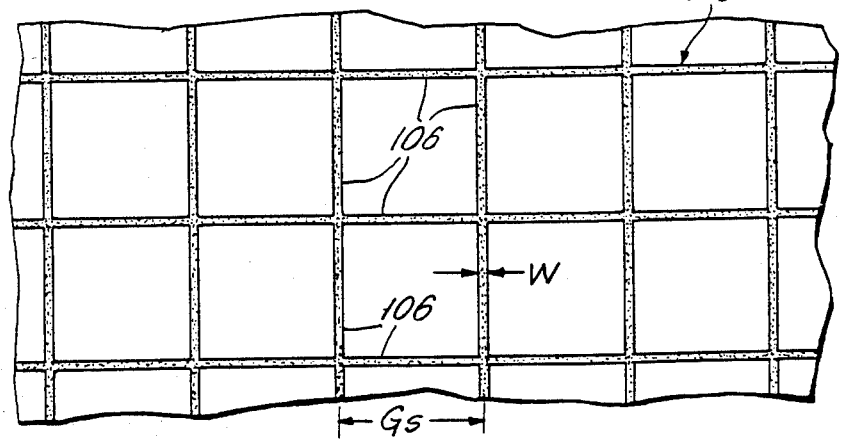
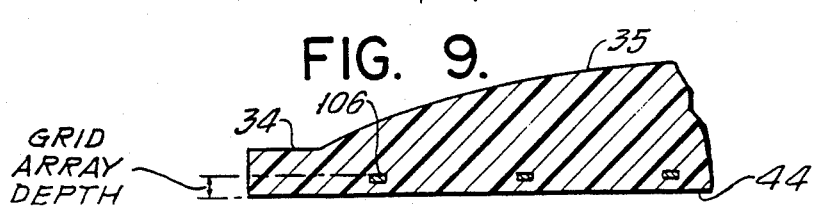

MICROWAVE TANK-CONTENTS LEVEL MEASURING ASSEMBLY WITH A PHASE CONTROLLED LENS

BACKGROUND OF THE INVENTION

The present invention relates to microwave tank-contents level measuring systems, and more particularly to the assembly to be mounted at an upper point of a tank the level of whose contents is to be measured.

In my copending U.S. patent application Ser. No. 692,576, filed Jan. 18, 1985, and entitled "Microwave Tank-contents Level Measuring Assembly With Lens-obturated Wall-opening", now U.S. Pat. No. 4,566,321, there is disclosed and claimed a system which is contained within a housing having an open end obturated by a hyperbolically curved convex-plano fluid impermeable solid dielectric lens providing a seal for the tank opening over which the housing is installed while collimating an outgoing ranging signal and focusing the return signal. A separate removeable housing cover provides access to the electronic components for service while the tank-opening sealing function of the lens is not disturbed. A transmitting-receiving horn is dimensioned and positioned on the axis of the lens with its effective phase center at the operating frequency coinciding with a focal point of the hyperbolic surface.

From a system standpoint, the distance measurement is determined by projecting toward the surface of the tank contents a microwave ranging signal whose frequency is swept back and forth relative to some predetermined center frequency. The radiated signal is reflected, in part, from the surface of the tank-contents and arrives back at the transmitting point after a delay which is a function of the transit time. The returned signal is mixed with a local signal corresponding to the instantaneous signal then being transmitted to produce a difference frequency signal which is representative of the distance to the surface of the tank contents. The difference frequency signal is sinusoidal in nature.

While the assembly described in my aforesaid application solves one major problem encountered with microwave level measuring equipment, namely, the problem of maintaining adequate containment of volatile gases and the like, such equipment suffers from its own peculiar problem. When apparatus as disclosed in my aforesaid application was used to measure distance to a target surface, a strong sinusoidal signal was detected that appeared as if coming from a target about two feet away. Testing the apparatus further, and simulating an empty tank, a weak return signal was produced at a much higher frequency than the strong signal but difficult to detect because of the strong lower frequency signal. On the other hand, when attempting to measure level in a full or near full tank, the desired signal was close in frequency to the strong signal and now difficult to separate from the strong signal.

After careful study and investigation it was discovered that the swept frequency ranging signal was experiencing reflection at the interface between the plano surface of the lens and the tank atmosphere, which reflection, although representing only a small fraction of the radiated energy, was large compared to legitimate returning ranging signals. Consequently, the lens interface reflection made detection of the tank-contents surface extremely difficult.

Dielectric lenses for use as focusing elements for microwave-antenna systems have been known for many years, and the antenna art has been aware of the energy losses that occur as a consequence of lens interface reflections. In an article entitled "Surface Matching of Dielectric Lenses" by E. M. T. Jones and S. B. Cohn, published in the *Journal of Applied Physics*, Vol. 26, No. 4, April 1955, pp. 452–457, two methods are discussed for cancelling the surface reflections of dielectric lenses. One method employs a reactive wall embedded within the dielectric. The reactive wall can be either of a capacitive nature formed from thin metallic discs distributed in an hexagonal array; or of an inductive nature formed from a wire grid. The correction described in this article is frequency dependent and all of the calculations therein are based upon use of a fixed frequency signal. Neither the Jones et al. article, nor subsequent articles written on the same subject, contain any suggestion that the reactive wall concept can be used advantageously when the signal does not have a constant fixed frequency.

SUMMARY OF THE PRESENT INVENTION

With the above-mentioned problem in mind, it is an object of the present invention to provide a non-invasive microwave tank-contents level measuring assembly that when installed is isolated from the contents of the tank and is significantly free of interference from lens interface reflections.

In accordance with the present invention there is provided a microwave tank-contents level measuring assembly comprising in combination a horn radiator-receptor for emitting a microwave preselected ranging signal to be reflected from the surface of the tank-contents for detecting and level determination, a dielectric microwave lens, impermeable to fluid, disposed and geometrically shaped and constructed for collimating said preselected ranging signal during its outward passage and, on its return passage, to focus said preselected ranging signal at a point substantially coincident with the effective phase center of said horn, means for joining said assembly to an upper point of a tank the level of whose contents is to be measured, said lens being exposed to the interior of said tank and cooperating with said joining means for permitting said passage of said ranging signal while maintaining fluid tight isolation of said horn from said tank-contents, and means associated with said lens for causing phase cancellation of signals reflected back to said radiator-receptor from the interface between the lens and the tank-contents-atmosphere, which reflected signals mimic returning ranging signals and interfere with detection of returning legitimate ranging signals.

BRIEF DESCRIPTION OF THE DRAWINGS

The invention will be better understood after reading the following detailed description of the presently preferred embodiments thereof with reference to the appended drawings in which:

FIG. 3 is a greatly enlarged fragmentary sectional view taken along line 3—3 in FIG. 2;

FIG. 4 is an enlarged fragmentary view with a portion broken away to show details of the disc array representing one embodiment of the subject invention;

FIG. 5 is an enlarged diagrammatic view of a unit pattern of the discs incorporated in the array of FIGS. 3 and 4;

FIG. 6 is a diagrammatic illustration for showing the relationship between the microwave horn and the dielectric lens and for explaining the operation of the present invention;

FIG. 7 is a plan view of a lens for incorporation in the assembly of FIG. 1 but representing a modification of the subject invention;

FIG. 8 is an enlarged fragmentary view illustrating the details of the grid pattern employed in the embodiment of FIG. 7;

FIG. 9 is a fragmentary sectional view taken along line 9—9 in FIG. 7 and illustrating the depth and location of the grid array of FIGS. 7 and 8 within the lens body.

The same reference numerals are used throughout the various figures of the drawings to designate the same or similar parts.

DETAILED DESCRIPTION OF THE PRESENTLY PREFERRED EMBODIMENTS

Figure 1:
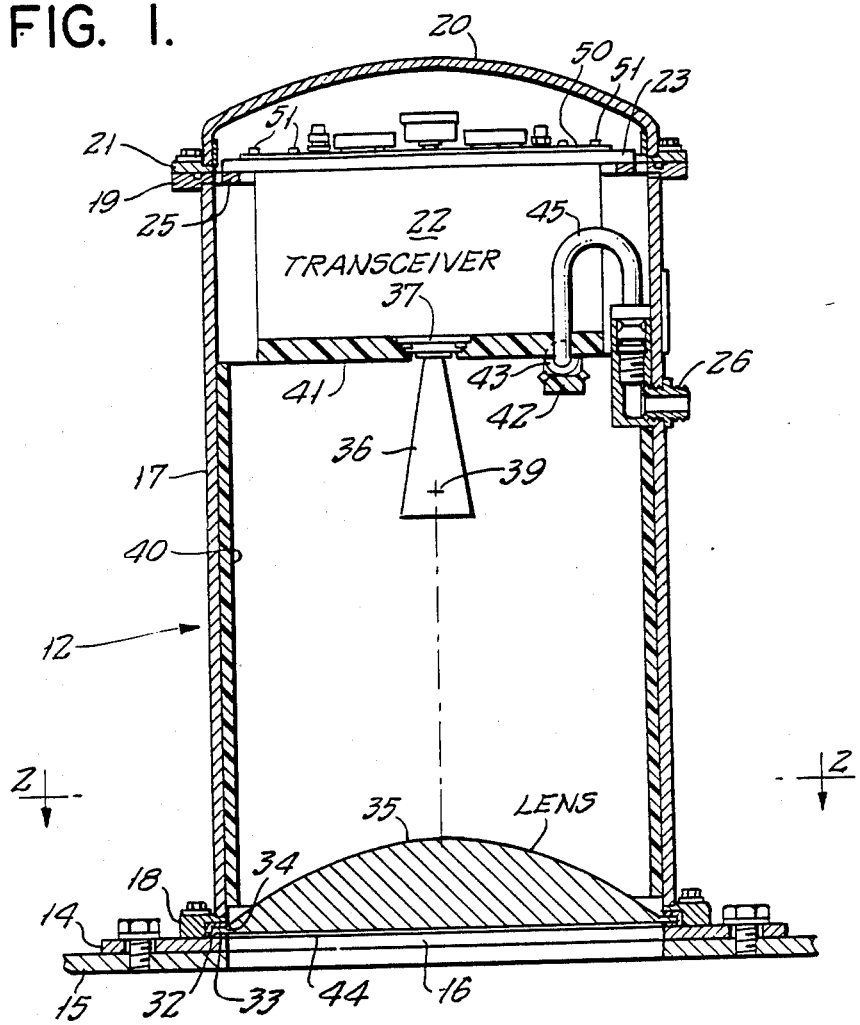
FIG. 1 is a vertical sectional view through a microwave level measuring assembly embodying the present invention and intended to be mounted on the top of a tank containing a liquid whose level is to be determined.

Referring to FIG. 1, there is shown in vertical cross section a non-invasive microwave measuring assembly or device designated generally by the reference numeral 12. The measuring assembly 12 is intended to be flange mounted on the top of a tank. In operation, the assembly 12 will project a ranging signal downwardly to the surface of the liquid contents within the tank (not shown) where it is reflected back to the assembly 12 for processing and level determination. Generally, such systems employ a frequency modulated carrier signal with the reflected signal being compared to a locally produced reference signal such that the frequency difference is indicative of the distance from the measuring assembly 12 to the surface of the liquid.

Figure 2:
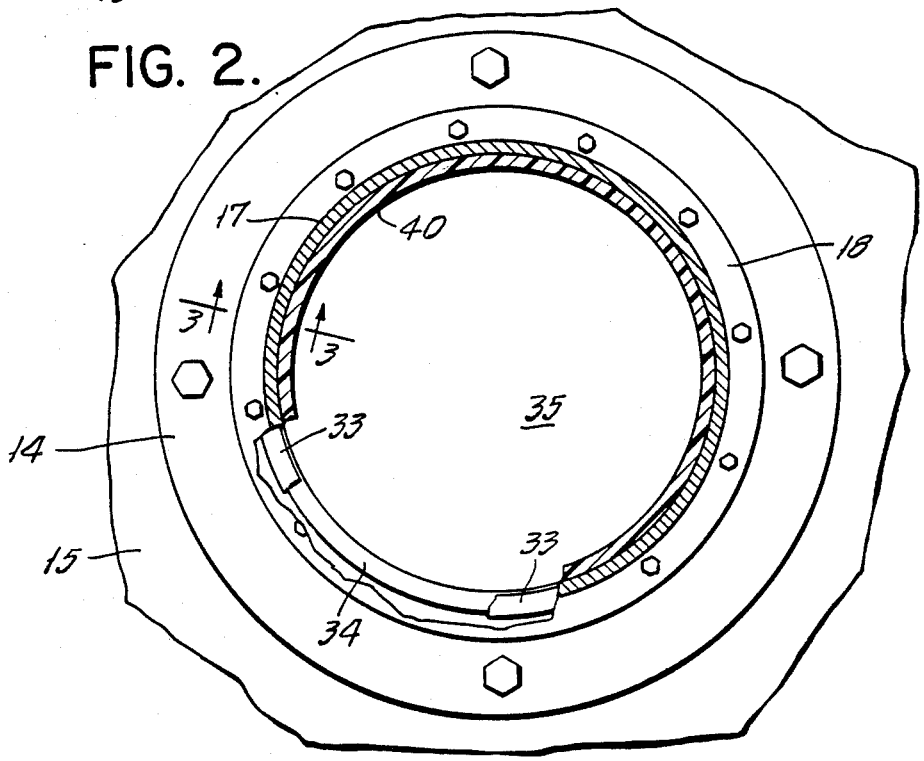
FIG. 2 is a transverse sectional view, with a portion broken away, taken along the line 2—2 in in FIG. 1.

Referring now to FIGS. 1 and 2, the measuring assembly 12 is seen as having a flange ring 14 having a radially outer circle of bolt holes for receiving bolts to attach the flange 14 to the top wall 15 of the tank (not shown). The flange ring 14 has a central opening 16 which is placed over and in registration with a corresponding opening in the top wall 15 of the tank.

The rest of the assembly includes a housing for the level measuring equipment consisting of a cylindrical body section 17, having a flange 18 at its lower end by which it is joined to the flange ring 14, and having another flange 19 at its upper end to which is separably bolted a housing cover 20 by means of its associated flange 21. The microwave transmitter-receiver system comprising generator and receiver apparatus (not shown) is contained within the enclosure 22. The latter is suspended by a flange 50 from a circular flange ring 23, the latter being secured by screws to an internally extending flange portion 25 formed integral with the flange 19. Screws 51 fasten flange 50 to ring 23. External electrical connections are effected to the assembly 12 through a conventional fitting 26 that communicates via a cable section 45 with the equipment in enclosure 22.

Across the bottom opening of the cylindrical section 17 of the housing, mounted within a rabbet 32 within the flange 18 with a channel gasket 33 surrounding its radially projecting flange portion 34 is a dielectric fluid impermeable microwave lens 35. When the flange 18 is properly bolted to the flange 14 the gasket 33 will establish, dependent upon the material of the gasket, at least a fluid-type seal between the radial flange portion 34 of the lens 35 and the adjacent components of the assembly 12 within the rabbet 32. Thus, when the flange 14 is properly bolted and sealed to the top of the tank, with the interposition of any suitable seal, the flange 14 in cooperation with the lens 35 will establish at least a fluid-tight cover over the opening in the tank. However, by removing the top cover 20 of the assembly 12, all of the electronic components are accessible for service without disrupting the seal over the tank opening provided by lens 35.

The microwave energy is communicated from and to the equipment within the enclosure 22 by means of a horn radiator-receptor 36 secured to the end of a wave guide (not shown) by means of a standard horn mounting flange 37 having a rectangular aperture providing the transition between the internal wave guide and the horn 36. The present system preferably operates at approximately 10 GHz.

The lens 35 may be constructed of a polyester resin material. It should be solid and free of any voids or discontinuities that would restrict or distort microwave transconductance. It has been found that a satisfactory plano-convex configuration with the convex surface defined as the surface obtained by rotating a hyperbola about its axis (a spherical hyperbola), said surface facing into the assembly 12, as shown, can be fabricated from a polyester-hardener casting composition that yields a dielectric having a relative dielectric constant of approximately 2.83.

In order to reduce internal reflections, the housing section 17 is lined with a high density conductive foam plastic 40. The bottom surface of the enclosure 22 is similarly covered with a layer of the same high density conductive foam plastic 41, and such plastic is also added at 42 to the exposed surface of the electrical fitting 43.

The lens 35 should be solid with no air pockets or voids. Optionally, it may be coated, particularly on its plano surface 44 with a chemically resistant dielectric coating, e.g., one of the fluorocarbon resins, if the resin material of the lens proper would be subject to chemical attack by the contents of the tank on which the measuring apparatus is to be mounted. An extremely thin layer of such coating, only thick enough to maintain its integrity as a chemical barrier, and essentially transparent to microwave energy, should be used so as to have negligible effect upon the refractive qualities of the lens.

In operation, the lens 35 will provide a lens-obturated wall opening, sealing the opening, functioning to collimate the ranging signal during its outward passage and to focus said ranging signal on its return passage at the point 39 substantially coincident with the effective phase center of the horn 36. A lens constructed as described above will provide an extremely narrow beam of radiant energy with negligible side lobes. This is important in order to minimize interfering signals being reflected from various structural members within a tank as opposed to the desired reflection from the surface of the tank content or liquid.

The device 12 as disclosed to this point is more fully described in my copending application identified above. Reference should be had to said application for additional details and dimensional information.

As mentioned above, it was discovered that a strong, unwanted signal was present and interfered with satisfactory measurement. The present invention overcomes that problem by incorporating in the lens 35 means for causing phase cancellation of the high amplitude signals reflected back to the radiator-receptor 36 from the interface between the lens 35 and the tank-contents-atmosphere, i.e., from the plano surface 44. The phase cancellation means is in the form of a layer of electrically conductive material disposed within the lens 35 in a plane parallel to the plano surface 44 of the lens. As seen in FIGS. 3, 4 and 5, the layer designated by the reference numeral 100 is formed from a uniform array of a repetitive pattern of regions containing electrically conductive material alternating with regions free of said material. Specifically, as shown in FIG. 5, the pattern consists of a series of circular discs 101 located at the corners of an equilateral triangle which pattern is multiplied, as best seen in FIG. 4, to form an hexagonal array which is then repeated throughout the entire radial expanse of the lens.

FIG. 4 is a fragmentary view looking toward the lens from the plano side with the overlying plastic stripped away to reveal the conductive discs. It is presently preferred to produce the layer of conductive material by first casting the convex side of the lens 35 down to the level at which the conductive layer 100 is to be located. Then the pattern of discs is produced by applying silver conductive ink to a thickness of approximately 1 mil., using an ink having a conductivity of 1 ohm-cm or better. Any suitable process for developing the pattern such as silk screening can be utilized.

After the conductive layer 100 is produced, additional resin material can be cast thereover in order to complete the lens configuration, including the flange portion 34.

The following dimensions have been found satisfactory for producing a workable lens embodying the present invention. The lens proper, minus the flange 34, has a diameter of approximately 13½ inches and a thickness, on axis, of approximately 2.425 inches. With a dielectric constant of 2.83 for the resin, the disc array depth (see FIG. 3) is approximately 0.255 inches; the disc diameter, D, is approximately 0.190 inches; the center-to-center distance between discs, dimension C, is approximately 0.360 inches; and the flange thickness, $T_F$, is approximately 0.250 inches.

An alternative array of the conductive regions may take the form of a grid as shown in FIGS. 7, 8 and 9 wherein the grid is designated generally by the reference numeral 105 located at a grid array depth of approximately 0.085 inches with each strip 106 having a width, W, approximately 0.078 inches and being spaced apart, centerline to centerline, dimension $G_S$, approximately 1.3 inches. All other dimensions for the lens and the thickness and construction of the conductive layer, can be the same as that described for the embodiment of FIGS. 3, 4 and 5.

Referring now to FIG. 6, when outgoing radiation leaves the horn 36 following the rays 110 and passes through the lens 35 across the lens-air boundary on the plano side 44, a small amount of energy is reflected because it approaches normal to the surface and the reflected energy retraces the outgoing ray path 110 as shown by the arrows 111 and 112, for example. This small reflected quantity of energy is refocused in the horn 36 and appears as a low frequency echo. The electrically conductive layer provides another reflective surface and by proper selection of all the dimensions of this conductive layer including the depth at which the layer is located within the lens the reflection from the conductive layer can be made equal in magnitude and 180° out of phase with the reflection from the lens-air boundary interface 44. The depth of the reactive wall is used to fine tune the phase cancellation. Both reflections will refocus in the horn cancelling each other in known manner.

A lens was constructed without the present invention and was found to provide a reflection of about 25% which corresponds to a VSWR of approximately 1.68 : 1. With the aid of the present invention, it has been found possible to reduce the VSWR to less than 1.2 : 1. This amounts to a 10 : 1 or better reduction between the interfering and desired signal power.

Having described the presently preferred embodiment of the invention, it will be apparent to those skilled in the subject art that various changes in construction may be introduced without departing from the true spirit of the invention as defined in the appended claims. For example, other known dielectric materials can be substituted for the polyester in producing the lens. If the dielectric constant is different, the specific dimensions mentioned above will require alteration and such dimensions are best determined empirically.

What is claimed is:

1. A microwave tank-contents level measuring assembly comprising in combination a horn radiator-receptor for emitting a microwave preselected ranging signal to be reflected from the surface of the tank-contents for detecting and level determination, a dielectric microwave lens, impermeable to fluid, disposed and geometrically shaped and constructed for collimating said preselected ranging signal during its outward passage and, on its return passage, to focus said preselected ranging signal at a point substantially coincident with the effective phase center of said horn, means for joining said assembly to an upper point of a tank the level of whose contents is to be measured, said lens being exposed to the interior of said tank and cooperating with said joining means for permitting said passage of said ranging signal while maintaining fluid tight isolation of said horn from said tank-contents, and means associated with said lens for causing phase cancellation of high amplitude signals reflected back to said radiator-receptor from the interface between the lens and the tank-contents-atmosphere, which reflected signals mimic returning ranging signals and interfere with detection of returning legitimate ranging signals.

2. A microwave tank-contents level measuring assembly according to claim 1, wherein said lens is plano-convex with its convex surface defined as the surface obtained by rotating a hyperbola about its axis, said horn having a radiation axis positioned colinearly with the optical axis of said lens, and said means for causing phase cancellation comprises a layer of electrically conductive material disposed within said lens in a plane parallel to the plano surface of said lens, said layer being formed from a uniform array of a repetitive pattern of regions containing said conductive material alternating with regions free of said material.

3. A microwave tank-contents level measuring assembly according to claim 2, wherein said layer of electrically conductive material comprises an hexagonal array of circular conductive regions.

4. A microwave tank-contents level measuring assembly according to claim 3, wherein the relative dielectric constant of the dielectric material constituting said lens is approximately 2.83, said circular conductive regions each has a diameter of about 0.190 inches and is spaced, center-to-center, from each adjacent conductive region, about 0.360 inches.

5. A microwave tank-contents level measuring assembly according to claim 4, wherein the plane of said layer of conductive material is disposed approximately 0.255 inches from said plano surface of said lens.

6. A microwave tank-contents level measuring assembly according to claim 3, wherein the plane of said layer of conductive material is disposed approximately 0.255 inches from said plano surface of said lens.

7. A microwave tank-contents level measuring assembly according to claim 2, wherein said layer of electrically conductive material is in the form of a rectilinear grid.

8. A microwave tank-contents level measuring assembly according to claim 7, wherein the relative dielectric constant of the dielectric material constituting said lens is approximately 2.83, and said grid comprises a network of intersecting strips, each about 0.078 inches wide with all strips spaced, centerline-to-centerline, from parallel adjacent strips, about 1.3 inches.

9. A microwave tank-contents level measuring assembly according to claim 8, wherein the plane of said layer of conductive material is disposed approximately 0.085 inches from said plano surface of said lens.

10. In a microwave tank-contents level measuring assembly wherein a microwave radiator-receptor is disposed within a housing having an opening obturated by a dielectric lens which lens serves to both collimate a preselected ranging signal during its outgoing and return passage as well as to seal a tank top wall opening, the improvement comprising an array of electrically conductive elements embedded in said lens for causing phase cancellation of high amplitude signals reflected back to said radiator-receptor from the interface between the lens and the tank-contents-atmosphere, which reflected signals mimic returning ranging signals and interfere with detection of returning legitimate ranging signals.

11. A microwave tank-contents level measuring assembly comprising in combination a housing, a microwave transmitter-receiver system coupled to a horn radiator-receptor for emitting a microwave preselected ranging signal to be reflected from the surface of the tank-contents for detection and level determination, said housing having a wall with an opening, said system and horn being mounted within said housing for transmitting and receiving said ranging signal through said wall opening, a dielectric microwave lens, impermeable to fluid, disposed over said opening and joined to said housing with at least a fluid-tight seal, said lens being geometrically shaped and constructed so as to collimate said preselected ranging signal during its outward passage and on its return passage to focus said preselected ranging signal at a point substantially coincident with the effective phase center of said horn, means for securing said housing with said lens-obturated wall-opening over an opening in a top wall of a tank with said lens establishing at least a fluid-tight seal over said tank opening, and means associated with said lens for causing phase cancellation of signals reflected back to said horn from the interface between the lens and the tank-contents-atmosphere, which reflected signals mimic returning ranging signals and interfere with detection of returning legitimate ranging signals.

* * * * *